J. B. Dougherty,
Making Hooks.
No. 106,260. Patented Aug. 9, 1870.
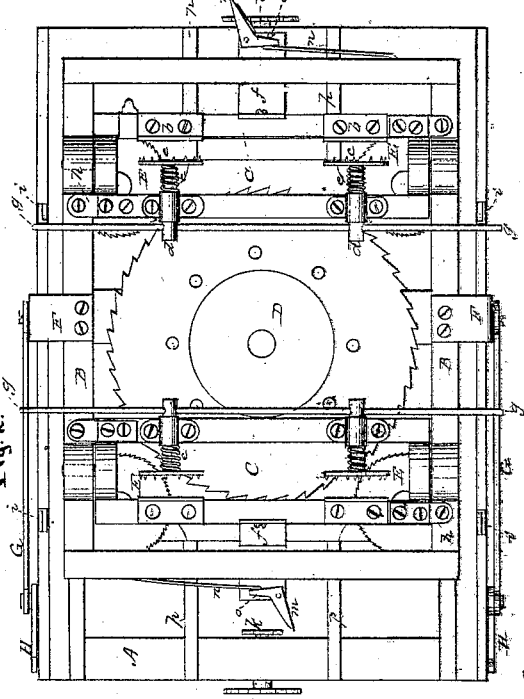
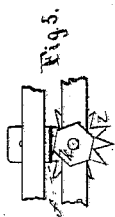
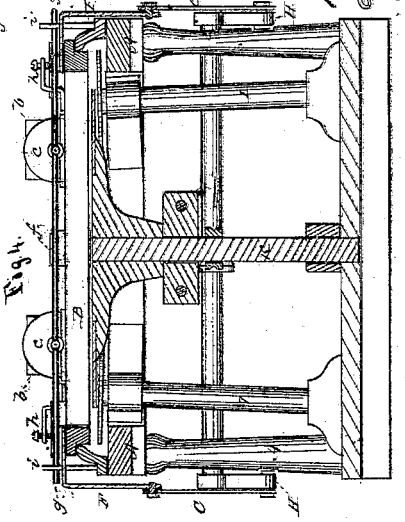
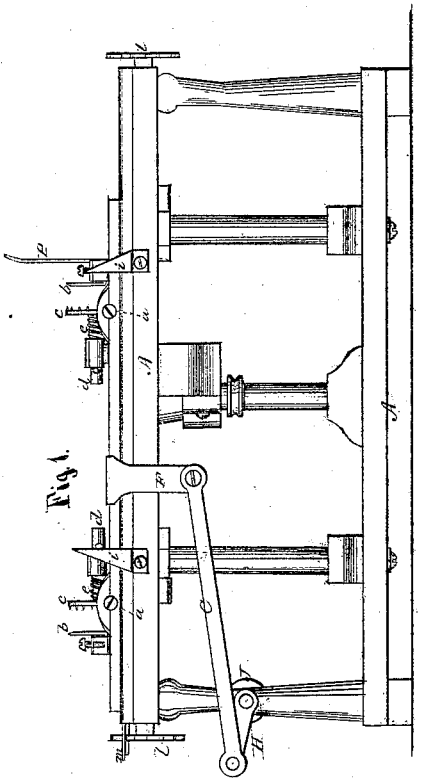
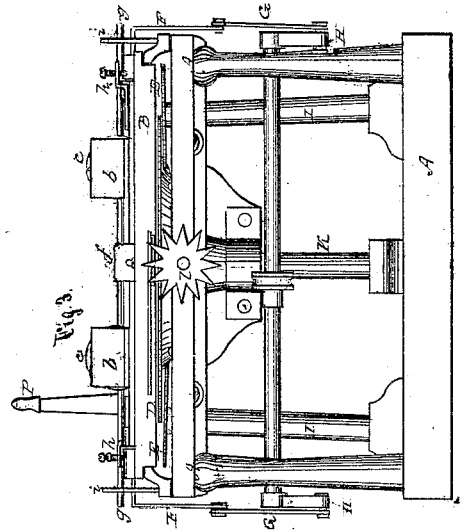

United States Patent Office.

JOHN B. DOUGHERTY, OF ROCHESTER, NEW YORK, ASSIGNOR TO HIMSELF, ROBERT E. SHERLOCK, JOSEPH C. SCHANCK, ALBERT G. WHEELER, AND PATRICK H. LAWLER, OF SAME PLACE.

Letters Patent No. 106,260, dated August 9, 1870.

IMPROVEMENT IN MACHINE FOR MANUFACTURING HOOPS.

The Schedule referred to in these Letters Patent and making part of the same.

*To all whom it may concern:*

Be it known that I, JOHN B. DOUGHERTY, of Rochester, in the county of Monroe and State of New York, have invented certain Improvements in Machines for Manufacturing Barrel-Hoops, of which the following is a specification, reference being had to the accompanying drawing.

My invention relates to the manufacture of barrel-hoops; and

The invention consists in so constructing a machine that, as a reciprocating carriage moves to and fro over a rotary saw, revolving in a horizontal plane, a hoop is cut from the edge of a plank, held in suitable devices on said carriage, smaller saws at each end, beveling the ends of the hoop at the same time, and thereby automatically producing at each operation a finished hoop, as hereinafter more fully explained.

Figure 1 is a side elevation;
Figure 2, a top plan view;
Figure 3, an end view;
Figure 4, a transverse vertical section through the center; and
Figure 5, a view of a portion detached.

In the manufacture of hoops, they have heretofore been made by sawing them from the edge of a plank, by slitting the plank lengthwise with an ordinary circular saw, and also by cutting or slicing them from the edge of a plank by means of a knife, as in my former patent.

Originally, the hoops were sawed off in plain strips, and then beveled by a subsequent operation. Subsequently, they were sawed beveled at the one operation of slitting them from the plank; and, still later, by my improved method of cutting or slicing them off, they were not only cut beveled, but also had their ends beveled or cut slanting at the same time.

By my present invention, I propose to produce a hoop by sawing it from the edge of a plank, by having the saw cut into the side of the plank to cut it beveled, and to slant the ends all at once, and entirely by the use of saws.

To accomplish these objects, I construct a machine as follows:

First, I make a rectangular frame, A, of about the height of an ordinary table or work-bench, it being supported in a horizontal position upon a suitable base by posts or legs, as represented in the drawing.

At the center of this frame I locate a large circular saw, D, as shown in fig. 2, this saw being mounted upon a vertical arbor, so as to revolve in a horizontal plane, as is customary in many of the modern shingle-machines.

Near each corner of the frame I then mount in a similar manner four smaller saws, E, these latter having their arbors, at both ends, resting in adjustable boxes, which can be moved laterally, so as to incline the upper face of these saws, as represented in figs. 3 and 4, and to adjust them for hoops of different lengths, the object of these smaller saws being to cut the slant on the ends of the hoop, to form the lap.

Upon the frame A and above the saws I mount a reciprocating carriage, B, which has pivoted in it, near each end, a tilting frame, C, the latter being arranged so as to reach transversely across the carriage B, and held therein by a journal, *a*, at the center of each end of C, as shown in fig. 1, and by dotted lines in fig. 2.

Upon these tilting frames C, at one side, are secured a couple of stationary plates, *b*, and directly opposite to them is mounted a pair of dogs, *c*, which latter consist of a circular plate, having projecting from its face a series of points, the plate itself being attached to a sliding stem, *d*, which latter has around it a spiral spring, *e*, arranged to force the dog *c* toward the plate *b*, so as to hold the plank, when set endwise, between them, as shown in figs. 1, 2, 3, and 4.

To the outer ends of these stems *d* is attached a rod, *g*, which extends entirely across the machine, and which strikes against stops *i*, secured to the sides of frame A, as the carriage C arrives near the end, thus holding the dogs while the carriage completes its movement, and thereby releasing the plank, letting it drop down, to be ready for another cut.

In order to tilt the frames C, I secure to the outer side of each, near its center, a plate, *f*, which has its lower end bent at a right angle outward, and is made adjustable vertically, and, in line with this plate *f* in the frame A, I mount a shaft, which has on its inner end a polygonal plate, *k*, as shown in fig. 5, and on its outer end a star-wheel, *l*, the plate *k* being so located that, as the carriage arrives at the end of its movement, the angle-plate *f* will be directly over it, the star wheel being at the outside of the frame A, as represented in figs. 2 and 3.

Upon the ends of the carriage B is secured a plate, upon which is pivoted a latch, *m*, as shown in fig. 2, the latch being held by a spring, *n*, against a stop or pin, *o*.

As the carriage B approaches the end of the frame, this latch, which has an inclined face on one side, strikes against one of the teeth of the star-wheel *l*, and, as it moves, turns the wheel *l*, and with it the plate *k*, the corner of which hits against the under side of the angle-plate *f*, thereby tilting the frame C, the dogs which hold the plank being so located that the plank will be on the outer side of the journals *a* of the tilting frame C, so that the weight of the plank will always tend to hold the outer side of the frame C down until the plank is released, and drops down upon the bars or rests *p* below, upon which it rests, while the frame C is being tilted by the movement of the star-wheel and its plate *k*.

To each side of the frame C, at one end, or at both, if desired, I secure a bent arm, h, the end of which projects out over the carriage B, and has in it a set-screw, as represented in figs. 2, 3, and 4, so that, by adjusting these screws, I can regulate the distance to which the frame C shall tip, and thereby the thickness of the hoop that will be cut.

It will be observed that the tilting frames C are pivoted or weighted, so that their inner sides will overbalance the outer sides, and that thus their inner sides will always assume the lower position, as soon as the outer side is relieved of the weight of the plank, by being undogged, and this is rendered certain also by the rods g striking against the stops i, and thereby tending to pull or tip the frames C to the required position.

If desired, a handle, P, may be attached to the frames C, by which they may be tilted by hand; but this is not intended to be done when the machine is provided with the devices for operating the frames C automatically.

Motion is imparted to the reciprocating carriage B by means of a shaft, J, located transversely at one end of the machine, below the bed, as shown in figs. 1, 3, and 4.

This shaft has a crank, H, at each end, which are connected by pitmen G to pendent plates F, secured rigidly to the carriage on opposite sides, as represented in the drawing. The saws are to be driven by belts from the actuating power, arranged in any suitable manner.

With a machine thus constructed, the operation is as follows:

A supply of suitably-prepared planks are provided, in which the notches for the lock of the hoops may be first cut, as described in a patent heretofore granted to me, and one of which planks is to be inserted in the tilting frame C, at each end of the machine. Motion being imparted to the machine, the carriage B moves forward, and, as it carries the plank with it, first brings the under edge, near each end, in contact with the small saws E, which, being inclined inward at the top, cut a thin, beveled or wedge-shape piece from the under edge of the plank, at each end, thereby forming the slant or bevel at the ends of the hoop. By the time this is completed, or before it is entirely done, the plank, in its forward movement, strikes the large saw centrally or midway of the length of the plank on its side, and is cut through in an instant, the part cut off thus forming a complete hoop, ready to be at once put on a barrel, unless it be preferred to first crimp it by another and subsequent operation. As the carriage returns, the plank is released by the rod g striking against the stops, i, and the frame C, being tilted up or down, according as the flat edge or the corner of plate k is brought uppermost under the angle-plate f; the dogs again secure the plank in place in the frame C, which moves forward for another cut.

In this machine, as arranged, the cut will be made in alternate right-angled and inclined lines to the side of the plank, thus forming a hoop which shall be beveled transversely its entire length, except where the ends are cut off slanting for the lap, and in such case it is obvious that the bevel will be all on one side of the hoop. By arranging the frames C so as to tip to an inclined position alternately each way, it is obvious that the bevel will be made equally on both sides.

As here shown, the machine is made double, that is, so as to cut on each side of the main saw, there being two of the tilting frames, so that one carries a plank up to the saw by the same movement of the carriage that draws the other back from the saw, though it is obvious that they may be made single acting, if desired.

The great advantages of this manner of manufacturing hoops over that of cutting them by knives, as described in my former patent, are these:

I find in practice that the knife, to prevent splitting the hoop, must be made very thin, and that, when so made, and a cut is to be made through a plank that has a crook or bend in its grain, the thin edge of the knife inclines to follow the bend of the grain, and thus the hoops are frequently uneven. In some cases this takes from the hoop, into which it thus "eats," so much as to make it so thin, at that point, as to render it entirely useless. Again, if the wood is at all inclined to be shaky, the knife is sure to split the wood and separate the fiber, so as to destroy it, and when the wood is at all cross-grained, these results are in like manner produced; but, by using saws in the manner described, all these difficulties are avoided, and, at the same time, the hoops can be cut as rapidly as by the former method.

Having thus described my invention,

What I claim, is—

1. The combination, in a hoop-machine, of a main saw for cutting off the hoop, and the inclined saws for cutting the inclined ends for the lap of the hoop, substantially as described.

2. The reciprocating carriage B, having secured thereto the frames C, arranged to tilt or tip in a vertical plane in the line of the movement of the carriage, substantially as set forth.

3. The combination of the latch m, star-wheel l, with its polygonal plate k and the tilting frame C, all constructed and arranged to operate substantially as described.

4. The sliding dogs c, having the rod g attached thereto, and arranged to strike against the stops i, substantially as and for the purpose set forth.

JOHN B. DOUGHERTY.

Witnesses:
  W. C. DODGE,
  PHIL. T. DODGE.